Patented Apr. 27, 1948

2,440,592

UNITED STATES PATENT OFFICE 2,440,592

SOLDERING FLUX

Keith Kennedy MacDougall, Chambly Canton, Quebec, and John Arthur Labash, Hamilton, Ontario, Canada, assignors to E. I. du Pont de Nemours & Company, Wilmington, Del., a corporation of Delaware No Drawing. Application April 21, 1944, Serial No. 532,202. In Canada April 29, 1943

2 Claims. (Cl. 148—23)

This invention relates to an improved soldering flux and more particularly to an improved flux of the type containing zinc chloride or a mixture of zinc chloride and ammonium chloride.

As is well known, satisfactory bonding of metallic surfaces by means of another and more fusible metal or alloy cannot be obtained unless the surfaces to be joined are first thoroughly cleaned and then maintained in this condition during the soldering operation. Of the known chemical cleaning agents fluxes are probably the most widely used since they can be adapted not only to remove any adhering film of metallic oxide, oil, grease, etc. from the surface of the metal but also to maintain the cleaned metallic surface free from oxide impurities which would otherwise be formed during the soldering operation. The soldering fluxes most widely used commercially are those of the non-corrosive type as represented by a resin base flux or those of the corrosive type having zinc chloride or a mixture of zinc chloride and ammonium chloride as the principal active ingredient. If to this latter type is added a metallic oxide such as zinc oxide the flux will be basic while one containing free acid such as hydrochloric acid is known as an acid corrosive flux. It is with this latter type that our invention is primarily concerned.

Soldering fluxes of the types described above work satisfactorily using a conventional tin-lead solder such as one containing 50% lead and 50% tin. They do not, however, work with comparable success with higher melting point solders such as those currently in use by industry, of which the so-called low tin (containing 40% or less tin) or lead-silver solders are illustrative. This is particularly true when high speed soldering is required as under such conditions the conventional corrosive type fluxes do not function satisfactorily in preparing the metallic surface while the non-corrosive or organic base fluxes decompose at temperatures below the melting point of the low tin or lead-silver solders. In neither instance is a satisfactory bond obtained.

Accordingly, an object of this invention is to provide a soldering flux which when used in conjunction with high melting point solders will provide a more satisfactory bond than heretofore obtainable. A further object is to provide a soldering flux containing zinc chloride or a mixture of zinc chloride and ammonium chloride which is particularly adapted to be used in conjunction with low tin or lead-silver solders. At still further object is to provide an acid flux containing a mixture of zinc chloride and ammonium chloride which when used with solders of the low tin or lead-silver type will provide a satisfactory bond on steel and zinc surfaces.

These objects are accomplished in accordance with our invention by the addition of from .5 to 5 percent by weight, based on the total solids weight, of a water soluble copper salt to an acid flux such as one containing a mixture of zinc chloride and ammonium chloride. Preferably the copper salt added is cupric chloride but any water soluble copper salt may be used, provided that an insoluble compound is not formed by double decomposition and provided the acidity of the flux composition is so adjusted that the copper salt will not precipitate out as the hydroxide. The presence of the copper salt in the improved flux composition of our invention ensures a satisfactory and enduring bond when low tin or lead-silver solders are used, the main reason for this being apparently due to plating out of the copper salt as metallic copper on the surface of the metal to be soldered. Hence the flux not only acts to initially clean the metal surface and then to protect it from further oxidation during the soldering operation but also provides a surface which has increased adherence to and for the molten solder.

The following formula is illustrative of a preferred soldering flux composition embodying our invention:

| | Parts by weight |
|---|---|
| Zinc chloride | 47 |
| Ammonium chloride | 3.5 |
| Acidity as HCl | 0.15 |
| Cupric chloride | 1.0 |
| Wetting agent (sulphated fatty alcohol type) | 0.25 |
| Water | 48.25 |

The application of sufficient heat to melt the solder also has an effect on the action of the flux so that both the metal surface to be soldered and the layer of copper deposited thereon are rendered highly active. Thus activated, the metal surface and the copper deposit will unite readily with the molten solder as it is applied. The copper deposit also alloys with the solder and improves the alloying qualities of the solder at the solder-metal junction. In addition, we have found that the alloy of solder and copper formed at the solder-metal junction possesses excellent flow characteristics thus promoting the penetration of the solder into small cracks and crevices on the surface of the metal to be soldered.

When applied to steel, zinc, copper or copper alloy surfaces and using a low tin or lead-silver solder, a flux made up according to the above formula gives results far superior to those obtainable using a conventional acid corrosive flux. Excellent coverage with solder is achieved and flowability of the solder while still liquid is improved, both resulting in a highly satisfactory bond.

The proportions stated in the above formula appear to give the best results although superior results are attained with wide variations of both the proportions and total amount of the ingredients. As previously stated, the water soluble copper salt should be present in amounts ranging from .5 to 5 percent by weight based on the total solids weight. While cupric chloride has been specified as the preferred water soluble copper salt, other soluble copper salts such as copper nitrate, copper citrate, copper formate, copper borate, copper salicylate and copper bromate may be used.

The presence of a wetting agent as indicated above is not absolutely essential but since it ensures an intimate contact between the flux and the surface to which it is applied and thus promotes the cleaning action of the flux, its use is desirable. While the choice of wetting agents is limited only by compatability with the ingredients of the flux, we have found that satisfactory results can be obtained by using a wetting agent of the types represented by the sulphated fatty alcohols and the sulphonated esters of dicarboxylic acids.

For certain purposes where the use of a paste-type flux is considered more desirable, part of the water in the formula given above may be replaced by petrolatum. Our invention likewise, contemplates the use of zinc chloride per se or the double salt zinc ammonium chloride, instead of a mixture of zinc chloride and ammonium chloride as specified above. Although described with particular reference to use in conjunction with low tin and lead-silver solders on steel and zinc surfaces, our soldering flux may also be successfully used with ordinary grades of tin-lead solder and on other ferrous metals as well as on copper and copper alloys.

The method of compounding the flux of our invention is not limited to any set procedure although generally we have found it most convenient to dissolve the zinc chloride and ammonium chloride in part of the water and the water soluble copper salt in the remaining portion of the water. The two portions are then mixed, the wetting agent added and the whole thoroughly mixed.

As many apparently widely different embodiments of this invention may be made without departing from the spirit and scope thereof, it is to be understood that this invention is not to be limited to the specific embodiments shown and described except as defined in the appended claims.

Having thus described our invention what we claim is:

1. A soldering flux having an acidity equivalent to 0.15 part by weight of HCl and having substantially the following composition:

| | Parts by weight |
|---|---|
| Zinc chloride | 47 |
| Ammonium chloride | 3.5 |
| Cupric chloride | 1.0 |
| Wetting agent | 0.25 |
| Water | 48.25 |

2. A soldering flux as claimed in claim 1 wherein the wetting agent is a sulphated fatty alcohol.

KEITH KENNEDY MacDOUGALL.
JOHN ARTHUR LABASH.

REFERENCES CITED

The following references are of record in the file of this patent:

UNITED STATES PATENTS

| Number | Name | Date |
|---|---|---|
| 87,968 | Rand | Mar. 16, 1869 |
| 139,297 | Cox | May 27, 1873 |
| 139,490 | Yager | June 3, 1873 |
| 1,399,810 | Shoemaker | Dec. 13, 1921 |
| 1,587,637 | Ferguson | June 8, 1926 |
| 1,800,477 | Schweitzer | Apr. 14, 1931 |
| 1,811,667 | Gravell | June 23, 1931 |
| 1,968,794 | Bertsch | July 31, 1934 |
| 1,974,436 | Schweitzer | Sept. 25, 1934 |
| 2,352,905 | Lundbye | July 4, 1944 |

FOREIGN PATENTS

| Number | Country | Date |
|---|---|---|
| 494,381 | Great Britain | Oct. 25, 1938 |